Nov. 14, 1950 W. A. MILLER 2,529,564

PULSE MULTIPLEX RECEIVING SYSTEM

Filed Sept. 17, 1946 3 Sheets-Sheet 1

INVENTOR
William R. Miller
BY H. S. Grover
ATTORNEY

PULSE MULTIPLEX RECEIVING SYSTEM

Filed Sept. 17, 1946 3 Sheets-Sheet 2

INVENTOR
William A. Miller
BY H. S. Grover
ATTORNEY

Nov. 14, 1950 W. A. MILLER 2,529,564

PULSE MULTIPLEX RECEIVING SYSTEM

Filed Sept. 17, 1946 3 Sheets-Sheet 3

INVENTOR
William A. Miller
BY H. S. Grover
ATTORNEY

Patented Nov. 14, 1950

2,529,564

UNITED STATES PATENT OFFICE 2,529,564

PULSE MULTIPLEX RECEIVING SYSTEM

William A. Miller, Port Jefferson, N. Y., assignor to Radio Corporation of America, a corporation of Delaware Application September 17, 1946, Serial No. 697,396

9 Claims. (Cl. 179—15)

This invention relates to signalling systems using constant width pulses which are of short duration compared to the time intervals between them and whose occurrence time is modulated in accordance with the intelligence to be conveyed. More particularly, the invention relates to the receiving terminal of such systems for demodulating the time displaced or modulated pulses.

In the foregoing systems, the amount of the phase displacement of the signal pulses is proportional to the amplitude of the modulating or intelligence signal, while the rate of the phase displacement of the signal pulses from the undeviated position is proportional to the modulation signal frequency. A synchronizing pulse (usually wider than the signal pulse) is employed after a desired number of signal pulses. The repetition rate of the synchronizing pulses is integrally related to that of the intelligence carrying pulses when unmodulated (that is, in the undeviated position).

In any demodulation scheme used for demodulating constant width, variable frequency or variable phase modulated pulses, it seems that it is necessary to change these modulated pulses into fixed phase and variable width pulses. Since this kind of modulated pulse is easily demodulated by passing them through a low-pass filter whose highest pass frequency is no more than one-half the repetition rate of the pulses, the final change from width modulated pulses to audio frequencies is easily accomplished.

An object of the invention is to provide an improved system for demodulating such phase modulated pulses; i. e., to derive the original modulation frequencies at the output terminals when phase modulated pulses are applied to the input terminals.

In considering the case where no multiplexing of the phase modulated pulses is used (single channel system), the incoming pulse train might look something like that shown in Fig. 1, line 1. It should be understood that the repetition rate of the synchronizing pulses is integrally related to that of the intelligence carrying pulses when unmodulated. The synchronizing pulses shown (the form of which will be discussed later) are, in accordance with one embodiment of the invention, selected and used to control the frequency of a square-wave generator which supplies these square waves at a constant frequency equal to the repetition rate of the unmodulated signal pulses. The output of the square-wave generator which, for example, might be a synchronized multivibrator, or a synchronized phase-shift oscillator with a limiter, is adjusted to approximately 50% mark–50% space, as is shown in Fig. 1, line 2. The pulses of line 1, Fig. 1, are fed into a self restoring trigger circuit, for example, a trigger circuit of the type described in United States Patent No. 2,399,135, granted April 22, 1946. This trigger circuit uses the pulses as trippers and generates a longer pulse which may closely approach a 50% mark–50% space square-wave, in the absence of modulation. The output of this trigger is shown in line 3, Fig. 1, assuming modulation. The output of the synchronized square-wave generator is then applied to the grid, and the output of the trigger circuit is applied to the cathode of a pulse selector tube circuit such as is described in United States application Serial No. 507,426, filed October 23, 1943, now abandoned. The result will be that only at the time when both the output of the square-wave generator and the output of the trigger circuit are positive will there be an output from the selector tube. Due to the varying shift in relative phase between the pulses of lines 3 and 2 of Fig. 1, the resulting output will be pulses of varying width, as shown in line 4, Fig. 1, which after passage through a low pass filter might appear as line 5, Fig. 1.

It will be noticed that in line 3 of Fig. 1, and, consequently in line 4, Fig. 1, the synchronizing pulses have been removed from the intelligence carrying pulse train. This is done to remove the possibility of audio-frequency distortion due to the presence of a constant width pulse at regular intervals, and may be accomplished by a delay trigger circuit and triggered pulse selector circuit in a manner described hereinafter.

The circuit used at the remote transmitter for making the synchronizing pulse wider than the signal or intelligence conveying pulses is a common one in pulse communication systems. Using several pulses of the same width as the modulated signal pulses but much more closely spaced is another known expedient for providing synchronization. In either case, an integrator circuit is used at the receiver in the invention to separate the synchronizing pulse from the signal intelligence conveying pulses. A common example of this method is in a television receiver where the vertical synchronizing pulse is obtained by integrating several closely spaced pulses to obtain a longer pulse of greater magnitude than the individual pulses.

Figure 1:
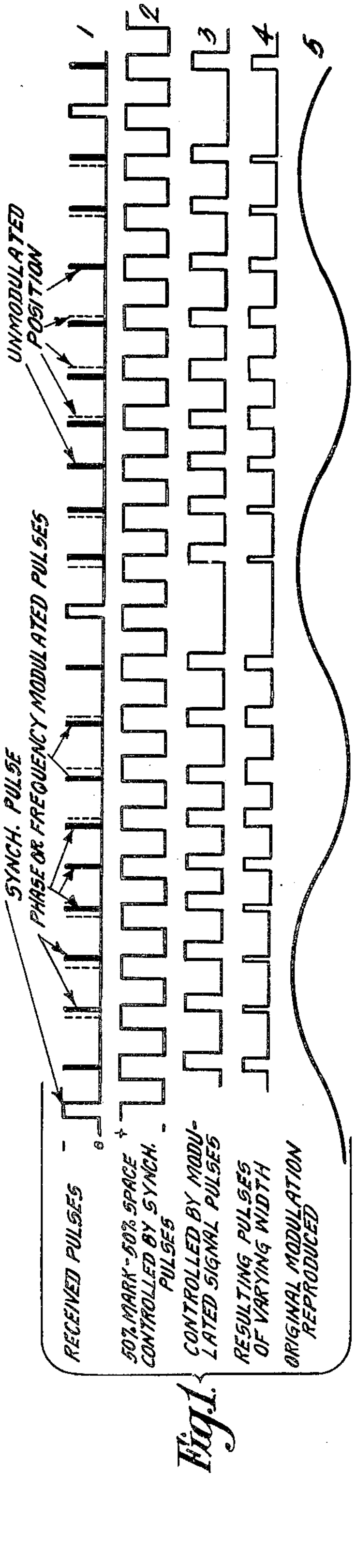
Fig. 1 is a series of graphs illustrating voltage variations at different points in the system of the invention and is given to aid in an understanding of the operation of the invention.
Figure 2:
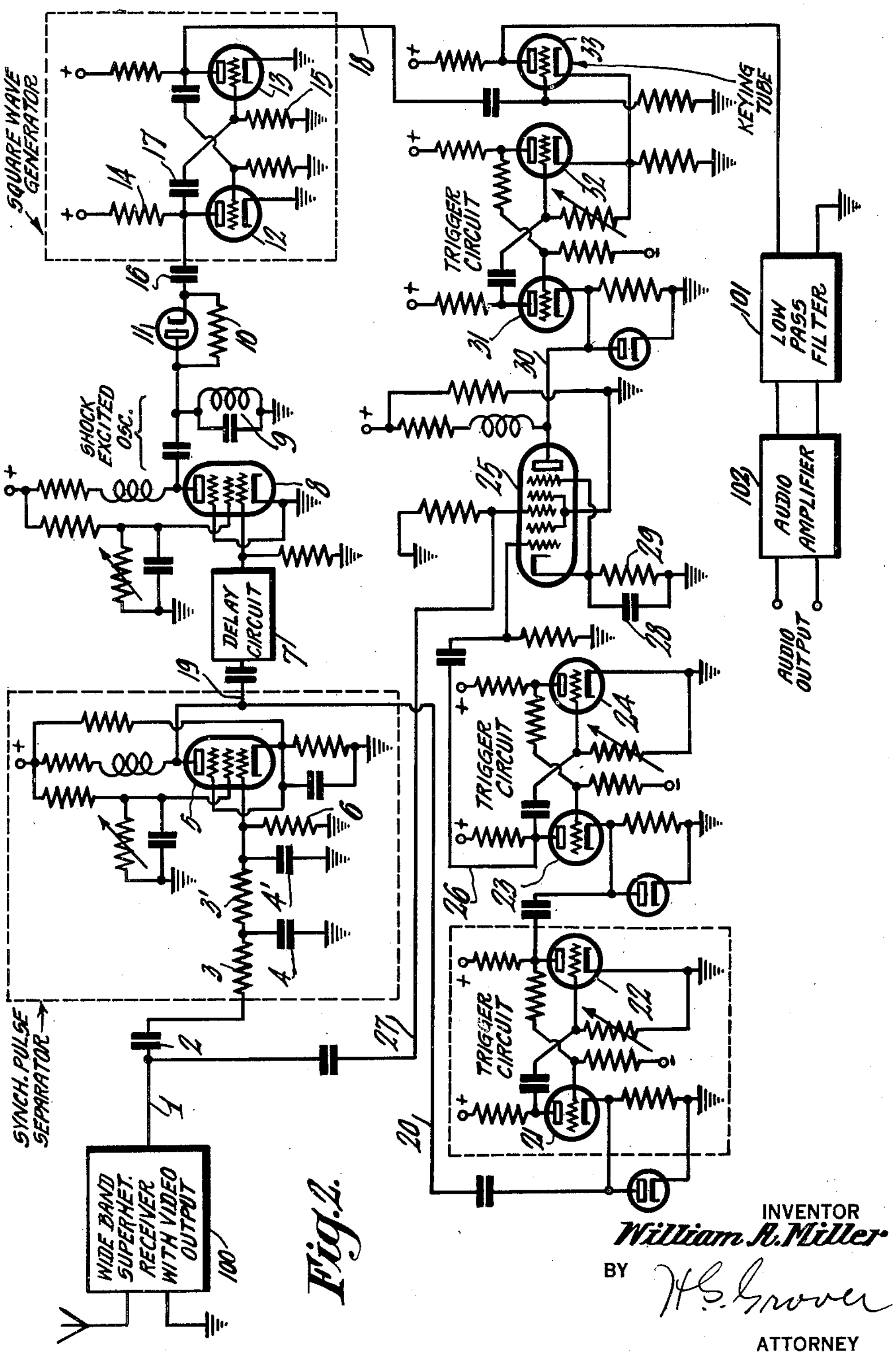
Fig. 2 illustrates one embodiment of a receiving terminal in accordance with the invention for receiving time or phase displaced constant width signal pulses interspersed with synchronizing pulses, and for converting these signal pulses to variable width pulses prior to obtaining the original modulation.

Fig. 2 shows, schematically, one embodiment of this invention. The antenna and receiver are typical circuits for pulse reception, either for pulse communication or for radar. The receiver (identified by reference numeral 100) is shown only in block form and is a wide band superheterodyne system providing a video output (as shown in line 1, Fig. 1). This pulse train is split at the junction point 1 (Fig. 2 is referred to hereinafter—unless otherwise specified), and one train is impressed through condenser 2 onto the integrating circuit 3, 3′, 4 and 4′ which, in effect, is a low pass filter. This integrating circuit has a time constant long enough so that the signal pulses do not increase the grid potential of vacuum tube 5 to the point of conduction during the period between synchronizing pulses. The time constant of 3, 3′, 4, 4′, on the other hand, must be short enough so that the potential across resistor 6 (i. e., the grid potential of tube 5) does decrease the bias on 5 until it conducts when the synchronizing pulse (which may be broader than the signal pulse, or may consist of several pulses much more closely spaced than the signal pulses) is present. Thus, the integrating circuit 3, 4, 3′, 4′ and tube 5 with its associated network are arranged to act at a synchronization pulse separator. Tube 5 is normally biased to cut off and only passes current during the occurrence of a synchronizing pulse. Because of the longer duration of the synchronizing pulse, the charge built up on the integrating circuit is greater than the individual charges built up due to the signal pulses. The signal pulses do not build up a sufficient charge to overcome the cut-off bias on tube 5. The charge caused by each signal pulse on the integrator dissipates between signal pulses. The output at the anode of 5 is a pulse which occurs shortly after the leading edge of the synchronizing pulse arrives at the input to the integrator. This delay is inherent in the integrator.

The output from 5 is fed through the delay circuit 7 to the grid of vacuum tube 8. The delay circuit to be used depends, in this embodiment, upon convenience. It is to be noted that the positive portion of the 50% mark–50% space square wave (line 2, Fig. 1) is positioned in time with respect to the undeviated signal pulse so that if all the signal pulses were undeviated (i. e., no modulation present) these would occur half way between the start and stop of the positive half-cycles of the square wave shown on line 2, Fig. 1. It is the purpose of the delay circuit 7 to make adjustment of the time of occurrence of the transmitted synchronizing pulse and the time when this synchronizing pulse should be applied to the square wave generator, which is the multivibrator 12, 13 in this embodiment. It is possible to either adjust the phase in the time interval between the synchronizing pulse and the first signal pulse, or delay the action over a whole period of the synchronizing pulse repetition frequency. In either case, the pulse delay network may be a system of trigger circuits such as is described in my application Serial No. 447,633, filed June 19, 1942, now Patent No. 2,402,917. The circuit 7 is so arranged that tube 8 is cut off by the output pulse from delay 7 for a time which is almost equal to the synchronizing pulse repetition period. That is, tube 8 is normally conductive and is biased to cut-off by the output pulse from 7 and is cut off just after the synchronizing pulse arrives at the input to delay circuit 7, and tube 8 is turned full on just after the last intelligence carrying signal pulse before the next synchronizing pulse has arrived.

Thus, tube 8 is on (i. e., conductive) only for a short time compared to the duration of the intelligence pulse train between an adjacent pair of synchronizing pulses. When tube 8 cuts off, the anode of tube 8 goes rapidly to a high positive potential which is fed through condenser C to tuned circuit 9. The fundamental frequency of tuned circuit 9 is the same as the repetition rate of the undeviated pulses. The circuit 9 will be shock excited by the pulse from tube 8 and will oscillate at its fundamental frequency for a time which, if R (anode resistor of 8) and resistor 10 are large, will depend strongly upon the losses in tuned circuit 9 and in resistors 14 and 15 in parallel (due to the action of diode 11) with the direct current resistance of tube 12 in the conducting state. In the event the synchronizing pulse repetition rate is so low that the damping in tuned circuit 9 is large enough to cause oscillations to die out before the next synchronizing pulse, it will be necessary to put in an additional buffer amplifier between tuned circuit 9 and the anode of tube 12. (In this case, the buffer amplifier could be biased in such a way that diode 11 and resistor 10 and condenser 16 could be eliminated.) Due to the action of diode 11, positive pulses from the tuned circuit 9 will be applied to the grid of tube 13 through condenser 17, thus synchronizing the multivibrator oscillator 12, 13 rigidly with the oscillations of the tuned circuit 9. Since the beginning time of the oscillations of tuned circuit 9 is controlled by the time when tube 8 turns off, it is possible to shift the phase of the output of trigger circuit 12, 13 with respect to the position of the intelligence carrying signal pulses until the positioning described above is obtained. When tube 8 turns on, it acts as a short circuit (nearly) across tuned circuit 9, removing the oscillatory energy and thus the synchronization from trigger circuit 12, 13, but this is for a very short time. Since the unsynchronized frequency of trigger circuit 12, 13 may be adjusted to be quite close to the synchronized frequency, it will be apparent that keeping trigger circuit 12, 13 in synchronism will present very little if any difficulty. This turning off is very advantageous from the standpoint that the tuning of the circuit 9 need not be as exact to keep in close enough step for nine pulses (as shown in line 1, Fig. 1) as it would for 18 pulses, etc. That is, the fact that circuit 9 starts oscillating anew for each repetition of the synchronizing pulse input to junction point 1 acts as a correction to the tuning of circuit 9. Lead 18 is connected to the anode of 13. The output on lead 18 is shown in line 2 of Fig. 1. Lead 18 is brought to the grid of keying tube 33.

The output of the synchronizing pulse separator tube 5 is split at 19. The lead 20 supplies the separated synchronizing pulse to the input of the self-restoring trigger circuit consisting of cross-coupled vacuum tubes 21, 22 and associated circuit elements. This trigger circuit, in turn, drives the self-restoring trigger circuit composed of cross-coupled vacuum tubes 23, 24. The delay of trigger circuit 21, 22 is made almost equal to the synchronizing pulse repetition rate, and the duration of the output of 23, 24 is made long enough to be long compared to the duration of the synchronizing pulse but short compared to the space between the last intelligence carrying pulse before the synchronizing pulse and the first intelligence carrying pulse after the synchronizing pulse. The proper adjustment of the duration of the pulse from trigger circuit 21, 22 is attained when the next synchronizing pulse occurs sometime during the time when the trigger circuit 23, 24 is in the active state.

The negative pulse from trigger circuit 23, 24 in its active state is coupled via lead 26 to one control grid of the tube 25 which is a mixer tube, say a 6SA7. The complete pulse train (line 1, Fig. 1) is coupled from junction 1 to the other control grid of 25 by lead 27. Tube 25 is biased by cathode resistor 29, by-passed by condenser 28, so that with no signal on either grid, or with no signal from the anode of tube 23 via lead 26 but with signal from 1 via lead 27, it is operating Class A. When trigger circuit 23, 24 is tripped to the active state by trigger circuit 21, 22, a pulse of negative polarity is applied to a control grid of mixer tube 25 of such magnitude as to stop current flow in tube 25. Thus, the tube 25 may be called the signal separator since the output taken from the anode of tube 25 by lead 30 contains only the intelligence carrying pulses, the synchronizing pulses having been removed by the above-described switching action.

Lead 30 constitutes the input to the self-restoring trigger circuit 31, 32 and keying tube 33. Trigger circuit 31, 32 and keyer tube 33 comprise a selector circuit such as is described in copending application Serial No. 507,426, supra. The duration of the output pulse from trigger circuit 31, 32 should be adjusted to be not much less than 50% of the repetition period of the intelligence carrying pulses. The signal pulses with the synchronizing pulse removed turn on the trigger circuit 31, 32. This is due to the fact that on account of the action of tube 33 in passing current only when both inputs are above the cut-off bias level, either the plus peaks or minus peaks of modulation (dependent upon the characteristics of the pulse modulator at the remote transmitter) will be cut off at high modulation levels if the phase shifted broadened pulse is allowed to be completely stopped from passage through tube 33. Conversely, if the duration of the output pulse from trigger circuit 31, 32 is allowed to be much greater than 50% of the repetition period of the intelligence pulses, clipping of the opposite modulation peaks will occur.

An oscilloscope applied to the anode of tube 32 would show a picture similar to that of line 3, Fig. 1.

Due to the above mentioned switching action of keying tube 33, the output of tube 33 (taken from its anode) is like that shown in line 4, Fig. 1, which are pulses whose width varies with the phase modulation of the incoming pulses.

As a summation of the procedure described above, I have been able to regenerate at the receiving terminal a train of new pulses corresponding to all of the received pulses. I have separated the intelligence conveying signal pulses from the received pulses and combined the separated intelligence signal pulses with the new train of produced pulses so as to produce pulses of variable width whose variations correspond to the modulation.

There are many different and well known ways of removing the audio frequency pulse width variations. The one shown in Fig. 2 is especially simple. A low pass filter 101 is used whose highest pass frequency is less than one-half the pulse repetition rate. This avoids the possibility of audible beats between the audio frequency and the pulse frequency. The output of 101 may be fed to a suitable audio amplifier 102 which in turn may feed a suitable utilization circuit.

It should be noticed that this circuit automatically removes noise fluctuations which change the width of the incoming signal pulse at the receiver. This has been shown to be of considerable importance in constant width variable pulse rate communication systems.

For some classes of circuits (low quality), it may be possible to omit the signal separator circuits, i. e., omit tubes 21, 22, 23, 24 and 25 and connect lead 20 directly to the cathode of tube 31 of trigger circuit 31, 32. However, this is not preferred.

Figure 3:
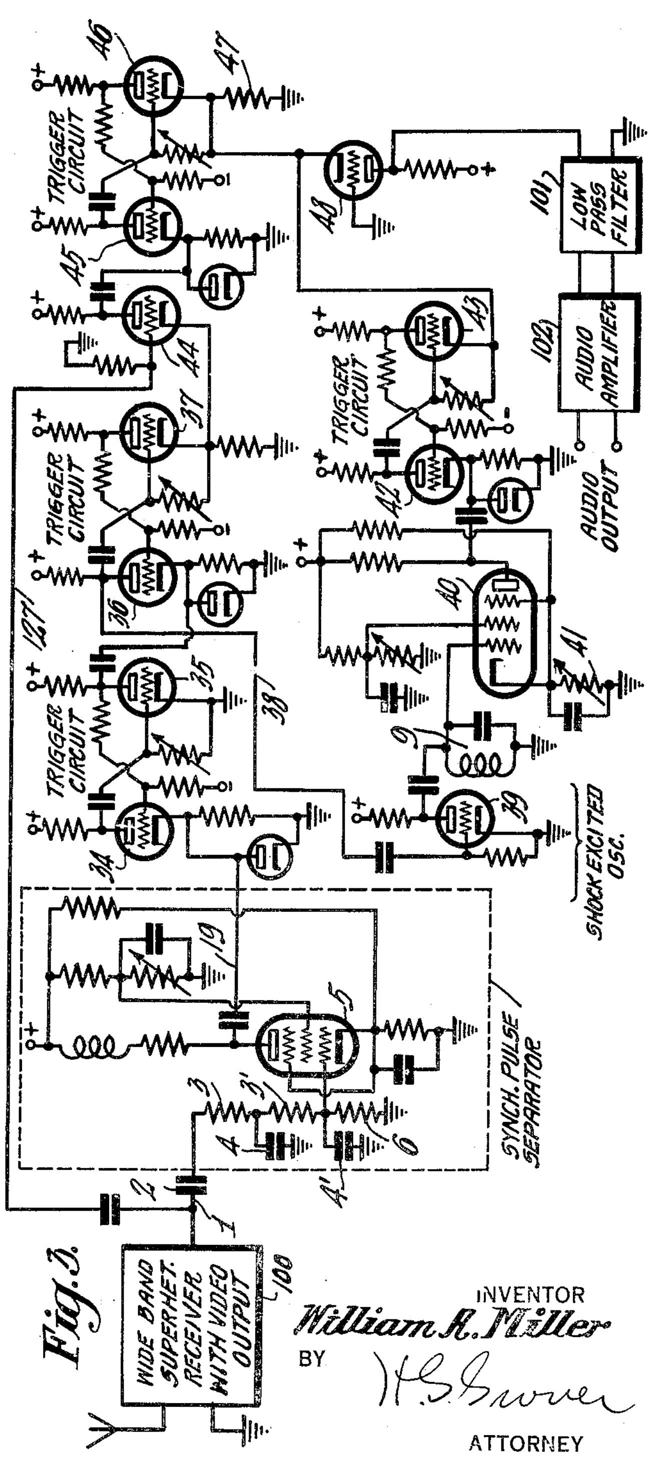
Fig. 3 illustrates another embodiment of a receiving terminal in accordance with the invention.

Fig. 3 shows an embodiment of the invention which combines several functions into one. In Fig. 3, synchronizing pulse separation is achieved exactly as in Fig. 2. The same circuit elements of both figures are represented by the same reference numerals. Lead 19 supplies a tripping pulse to self-restoring trigger tube circuit 34, 35.

The duration of the output from this trigger circuit is slightly less than one-half the time between the trailing edge of the synchronizing pulse and the first intelligence pulse thereafter. When tube 35 becomes conducting at the end of the active period of trigger circuit 34, 35, self-restoring trigger 36, 37 is tripped. The active time of this trigger circuit 36, 37 is adjusted so that it returns to its stable state at a little more than half the time between the last intelligence pulse of the train and the next synchronizing pulse. In other words, trigger 36, 37 has an active time which covers all of the time period occupied by the signal pulses.

Output is taken from the anode of tube 36 via lead 38 which extends to the grid of tube 39. Tube 39 is normally conducting. The output pulse from tube 36 during the active time of trigger circuit 36, 37 is negative and adjusted to such magnitude that tube 39 is cut off for the active time of trigger circuit 36, 37. This sudden cutting-off of tube 39 causes oscillatory voltages to be developed in tuned circuit 9 just as described above for Fig. 2. These oscillatory voltages are applied to the grid of tube 40 which is biased at such a point (by adjustment of rheostat 41) that negative pulses are applied to the self restoring trigger circuit 42, 43 at the signal pulse repetition rate. Tube 40 is a buffer amplifier and clipper. The phase of the 50% mark—50% space square wave output of 42, 43 may be adjusted by varying rheostat 41 slightly and by adjusting the length of time in which trigger circuit 34, 35 is active until the condition is as shown in line 2, Fig. 1, and as described in connection with Fig. 2. If this amount of phase shift is insufficient, an ordinary condenser phase shifter may be used between tuned circuit 9 and the grid of tube 40.

The entire signal (line 1, Fig. 1) is applied to the grid of tube 44 via lead 127 from junction 1. The cathode of vacuum tube 44 is keyed by trigger circuit 36, 37. Trigger circuit 36, 37 and keyer tube 44 comprise a selector system such as is described in copending application Serial No. 507,426 supra. Thus, since trigger circuit 36, 37 is inactive (i. e., tube 37 conducts) for a short time before, during and after each synchronizing pulse except the first, the output of tube 44 will contain only the pulses which are intelligence modulated.

These intelligence pulses are then used to trip the self-restoring trigger circuit 45, 46 which produces pulses which are nearly 50% of the unmodulated pulse repetition period in length just as is the case for trigger circuit 31, 32 of Fig. 2. Resistor 47 is common to the cathode circuit of both trigger tubes 43 and 46, and by adjusting it to be of such magnitude that, if either tube 43 or 46 is conducting, keyer tube 48 is cut off. Hence, only when both tubes 43 and 46 are both cut off will keyer tube 48 pass current, and due to the phase relations discussed in connection with Fig. 2, the output at the anode of 48 will appear as width modulated pulses (line 4, Fig. 1). A low pass filter 101 and audio amplifier 102 completes the demodulating system.

In the above discussion, it has been assumed that the demodulator is used for single channel telephony. Let it now be assumed that each individual pulse which carries intelligence in the train between synchronizing pulses is from a different channel of a time division multiplex telephone transmitter where the first pulse is always from the first channel, the second pulse from second channel, etc. In such case, the circuit of either Fig. 2 or Fig. 3 (in a slightly modified form) should be used from a tube economy standpoint, to change the phase modulated pulses to width modulation pulses before separating the channels. The output from the anode of tubes 33 or 48, however, should not be connected immediately to a low pass filter but to a channel separating circuit such as that shown in Fig. 4, although not limited thereto.

Figure 4:
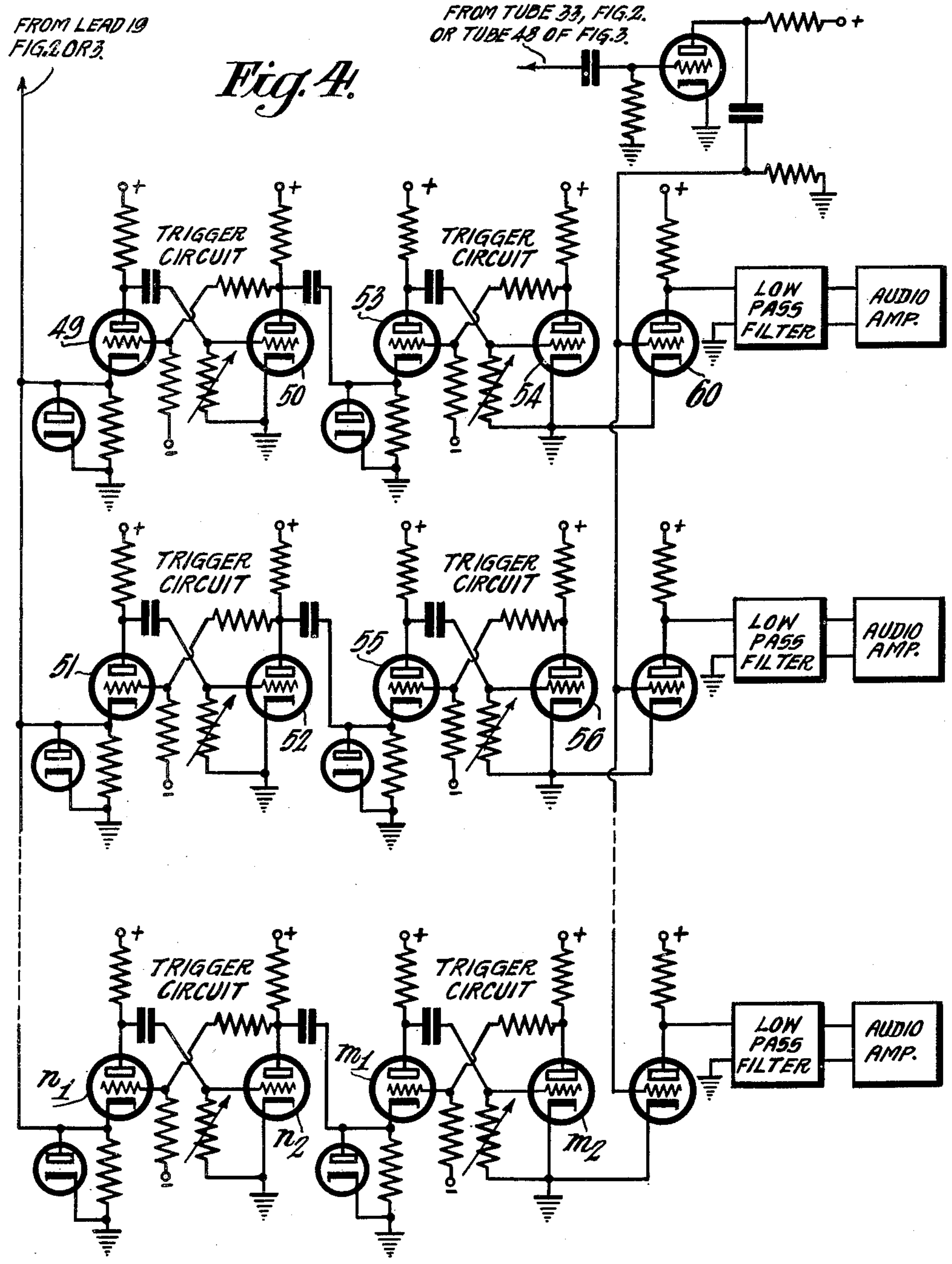
Fig. 4 illustrates a modification of the receiving terminal especially applicable to multiplex systems, in accordance with the invention.

Referring to Fig. 4, the synchronizing pulse is fed from the anode of the synchronizing pulse separator 5 to a number of trigger circuit inputs, one for each channel (for example, nine in the case of Fig. 1). These trigger circuits all start simultaneously due to the common input synchronizing pulse, but they turn off at different times. The self restoring trigger circuit 49, 50, for example, turns off very rapidly after the synchronizing pulse occurs; trigger 51, 52 turns off half way between the first and second pulse, etc., down to N1, N2 which turns off half way between the next to the last and the last intelligence carrying pulse before the arrival of the next synchronizing pulse.

When trigger circuit 49, 50 turns off (i. e., returns to the stable state) self-restoring trigger 53, 54 becomes active for a time almost equal to the time between the pulses of line 1, Fig. 1. Thus the unmodulated pulse in channel 1 occurs when the active period of 53, 54 is about one-half over. Thus the keying action of tube 60 (note selector action of copending application Serial No. 507,426, supra) is such that, when its grid is supplied from the anode circuit of tube 48, Fig. 3, or 33, Fig. 2, only the pulse from channel 1 appears at the anode of 60.

Trigger circuits 53, 54, 55, 56, etc., *m1*, *m2* all have the same active time, but are individually controlled by their starting trigger circuits 49, 50; 51, 52, etc., respectively, so that channel separation is achieved.

The circuits of Figs. 2 and 3 may be modified since it is no longer necessary to remove the synchronizing pulse by means of (for example) the mixing tube 44 of Fig. 3 or the circuits of tubes 21, 22, 23, 24, 25 of Fig. 2, because the multiplex channeling circuit shown in Fig. 4 already does this.

An advantage of the systems of Figs. 2, 3 and 4 is the fact that they remove excess noise due to width fluctuations of the phase modulated pulses.

What is claimed is:

1. In a pulse communication system wherein a plurality of spaced equal duration intelligence conveying pulses and at least one synchronizing pulse are transmitted for each frame or cycle of operations and wherein the occurrence time or phase of each intelligence conveying pulse is variable over a range by the signal modulation, the method of operation which includes receiving the transmitted pulses, producing from only the received synchronizing pulse a plurality of substantially equally spaced square waves corresponding in number to the number of pulses received during each frame or cycle of operations, separating the intelligence conveying pulses from the synchronizing pulse, combining the square waves with the separated intelligence carrying pulses in such manner as to convert the time modulated intelligence pulses to width modulated pulses.

2. In a pulse communication system wherein a plurality of spaced equal duration intelligence conveying pulses and at least one synchronizing pulse are transmitted for each frame or cycle of operations and wherein the occurrence time or phase of each intelligence conveying pulse is variable over a range by the signal modulation, the method of operation which includes receiving the transmitted pulses, producing from only the received synchronizing pulse a plurality of 50% space square waves having a predetermined polarity and corresponding in number to the number of pulses received during each frame or cycle of operations, separating the intelligence conveying pulses from the synchronizing pulse to produce other pulses representative solely of said intelligence conveying pulses and having said predetermined polarity, and combining said square waves with said pulses which are solely representative of the intelligence conveying pulses to thereby produce a pulse when one of said square wave pulses occurs simultaneously with one of said other pulses and of a time duration equal to the interval of simultaneous occurrence, whereby the intelligence conveying time modulated pulses are converted to width modulated pulses.

3. In a pulse communication system wherein a plurality of equal duration spaced intelligence conveying pulses and at least one synchronizing pulse are transmitted for each frame or cycle of operations and wherein the occurrence time or phase of each intelligence conveying pulse is variable over a range by the signal modulation, the method of operation which includes receiving the transmitted pulses, separating the synchronizing pulse from the intelligence conveying pulses, combining all of the received pulses with the separated synchronizing pulse to thereby produce only intelligence conveying pulses, producing from only the separated synchronizing pulse a plurality of 50% space square waves corresponding in number to the number of pulses received during each frame or cycle of operations, and combining said 50% space square waves with the separated intelligence conveying pulses, to thereby convert the time modulated intelligence pulses to width modulated pulses.

4. In a pulse communication system wherein a plurality of spaced equal duration intelligence conveying pulses and at least one synchronizing pulse are transmitted for each frame or cycle of operations and wherein the occurrence time or phase of each intelligence conveying pulse is variable over a range by the signal modulation, the method of operation which includes receiving the transmitted pulses, producing from only the received synchronizing pulse a plurality of substantially equally spaced square waves corresponding in number to the number of pulses received during each frame or cycle of operations, separating the intelligence conveying pulses from the synchronizing pulse, producing time displaced rectangular waves representative of only said separated intelligence conveying pulses, and obtaining width modulated pulses by the summation of said square waves and said rectangular waves.

5. In a pulse communication system producing a plurality of spaced intelligence conveying pulses and a synchronizing pulse for each frame or cycle of operations, the repetition rate of said synchronizing pulses being integrally related to that of said intelligence conveying pulses, a receiving system therefor comprising a circuit for separating the synchronizing pulse from the intelligence conveying pulses, means responsive to the output of said last circuit for producing a train of rectangular waves corresponding in number to the number of received pulses for each frame or cycle of operations, said means including a circuit for varying the phasing or time of initiation of said plurality of waves, and means for producing a train of rectangular waves representative of only said intelligence conveying pulses, and a selector circuit coupled to the outputs of both said means for producing a pulse solely when one rectangular wave of one train occurs simultaneously with one rectangular wave of the other train and has the same relative polarity.

6. In a pulse communication system producing a plurality of spaced intelligence conveying time modulated pulses and a synchronizing pulse for each frame or cycle of operations, the repetition rate of said synchronizing pulses being integrally related to that of said intelligence conveying pulses, a receiving system therefor comprising a circuit for separating the synchronizing pulse from the intelligence conveying pulses, means responsive to the output of said last circuit for producing a train of rectangular waves corresponding in number to the number of received pulses for each frame or cycle of operations, said means including a circuit for varying the phasing or time of initiation of said plurality of waves, means for producing a train of rectangular waves representative of only said intelligence conveying pulses, and a selector circuit coupled to the outputs of both said means for converting the time modulated intelligence conveying pulses to width modulated pulses.

7. In a pulse multiplex system wherein a plurality of spaced equal duration time modulated channel pulses and a synchronizing pulse are transmitted for each frame or cycle of operations and wherein the occurrence time of each channel pulse is variable over a range by the signal modulation for that particular channel, the method of operation which includes receiving the transmitted pulses, producing from only the received synchronizing pulse a plurality of equally spaced square waves corresponding in number to the number of pulses received during each frame or cycle of operations and commencing at an adjustable time after the receipt of said synchronizing pulse, separating the channel pulses from the synchronizing pulse, combining the square waves with the separated channel pulses in such manner as to convert the time modulated channel pulses to width modulated pulses, and feeding both the width modulated pulses and the separated synchronizing pulse to a plurality of individual channels, and causing the different channels to become responsive at different times.

8. In a pulse multiplex communication system producing a plurality of spaced intelligence conveying time modulated pulses and a synchronizing pulse for each frame or cycle of operations, the repetition rate of said synchronizing pulses being integrally related to that of said intelligence conveying pulses, a receiving system therefor comprising a circuit for separating the synchronizing pulse from the intelligence conveying pulses, means responsive to the output of said last circuit for producing a train of rectangular waves corresponding in number to the number of received pulses for each frame or cycle of operations, said means including a circuit for varying the phasing or time of initiation of said plurality of waves, means for producing a train of rectangular waves representative of only said intelligence conveying pulses, and a selector circuit coupled to the outputs of both said means for converting the time modulated intelligence conveying pulses to width modulated pulses, a plurality of individual channel circuits, each of said channel circuits including a pair of cascade-connected self-restoring trigger circuits followed by a keyer tube, a connection from the first of said pair of trigger circuits in each channel to the output of said synchronizing pulse separator circuit, and a connection from the keyer tube in each channel to the output of said selector circuit, the first trigger circuits in said channels having different time constants whereby said first trigger circuits start off simultaneously but restore themselves at different times.

9. In a pulse multiplex communication system wherein a plurality of equal duration time modulated channel pulses and one or more synchronizing pulses are transmitted for each frame or cycle of operations and wherein the occurrence time of each channel pulse is variable over a range by the signal modulation for that particular channel, a receiving terminal having means for converting the time modulated pulses to width modulated pulses, a plurality of individual channel circuits coupled to said means, each of said channel circuits including a pair of cascade-connected trigger circuits followed by a keyer tube, the first trigger circuits of said channel circuits having different time constants.

WILLIAM A. MILLER.

REFERENCES CITED

The following references are of record in the file of this patent:

UNITED STATES PATENTS

| Number | Name | Date |
|---|---|---|
| 2,048,081 | Riggs | July 21, 1936 |
| 2,199,634 | Koch | May 7, 1940 |
| 2,262,838 | Deloraine et al. | Nov. 18, 1941 |
| 2,403,210 | Butement et al. | July 2, 1946 |
| 2,406,165 | Schroeder | Aug. 20, 1946 |
| 2,416,330 | Labin et al. | Feb. 25, 1947 |
| 2,423,466 | Peterson | July 8, 1947 |

FOREIGN PATENTS

| Number | Country | Date |
|---|---|---|
| 520,448 | Great Britain | Apr. 24, 1940 |